US009992572B2

(12) United States Patent
Buck et al.

(10) Patent No.: US 9,992,572 B2
(45) Date of Patent: Jun. 5, 2018

(54) DEREVERBERATION SYSTEM FOR USE IN A SIGNAL PROCESSING APPARATUS

(75) Inventors: Markus Buck, Biberach (DE); Tim Haulick, Blaubeuren (DE); Gerhard Uwe Schmidt, Ulm (DE)

(73) Assignee: NUANCE COMMUNICATIONS, INC., Burlington, MA (US)

(*) Notice: Subject to any disclaimer, the term of this patent is extended or adjusted under 35 U.S.C. 154(b) by 2034 days.

(21) Appl. No.: 11/832,445

(22) Filed: Aug. 1, 2007

(65) Prior Publication Data

US 2008/0292108 A1 Nov. 27, 2008

(30) Foreign Application Priority Data

Aug. 1, 2006 (EP) .................................. 06016029

(51) Int. Cl.
*H04R 3/04* (2006.01)
*H04M 9/08* (2006.01)
*G10L 21/0208* (2013.01)

(52) U.S. Cl.
CPC .......... *H04R 3/04* (2013.01); *G10K 2210/506* (2013.01); *G10L 21/0208* (2013.01); *G10L 2021/02082* (2013.01); *H04M 9/082* (2013.01); *H04R 2430/03* (2013.01)

(58) Field of Classification Search
CPC . G10K 2210/506; G10L 21/02; H04M 9/082; H04R 2430/03
USPC ............ 381/66, 92, 71.1, 63, 93; 379/406.1, 379/406.12, 410; 704/220, 226
See application file for complete search history.

(56) References Cited

U.S. PATENT DOCUMENTS

| 5,305,307 | A  | * | 4/1994 | Chu .............................. 370/288 |
| 5,721,772 | A  | * | 2/1998 | Haneda et al. .......... 379/406.14 |
| 5,859,914 | A  | * | 1/1999 | Ono et al. ...................... 381/66 |
| 6,694,020 | B1 |   | 2/2004 | Benesty |
| 7,068,798 | B2 | * | 6/2006 | Hugas et al. .................... 381/93 |
| 7,171,003 | B1 | * | 1/2007 | Venkatesh et al. ............. 381/66 |
| 7,630,503 | B2 | * | 12/2009 | Schulz et al. ................... 381/92 |
| 7,764,783 | B1 | * | 7/2010 | Pai et al. ................. 379/406.08 |
| 2004/0170284 | A1 | * | 9/2004 | Janse et al. ..................... 381/66 |
| 2004/0204933 | A1 | * | 10/2004 | Walker ........................ 704/220 |
| 2005/0118956 | A1 | * | 6/2005 | Haeb-Umbach et al. . 455/67.11 |

(Continued)

FOREIGN PATENT DOCUMENTS

EP         1 521 240 A1    4/2005
WO    WO 2006/011104 A1    2/2006

OTHER PUBLICATIONS

Heng-Chou Chen, Oscal T.-C.Chen, a Subband Acoustic Echo Canceller Using the NLMS Algorithm with Quasi-orthonormal Initialization Scheme,IEEE,p. 331-334.*

(Continued)

*Primary Examiner* — Davetta W Goins
*Assistant Examiner* — Kuassi Ganmavo
(74) *Attorney, Agent, or Firm* — Daly, Crowley Mofford & Durkee, LLP (57) ABSTRACT

A system used in a loudspeaker-room-microphone environment includes a microphone signal partitioner that divides a signal from a microphone into one or more divided portions. A reverberation energy estimator estimates reverberation energy in some of the divided portions of the microphone signal based on a loudspeaker signal. The estimated reverberation energy is processed to generate a dereverberated output signal.

50 Claims, 6 Drawing Sheets

(56) References Cited

U.S. PATENT DOCUMENTS

| | | | |
|---|---|---|---|
| 2005/0244023 A1 | 11/2005 | Roeck et al. | |
| 2006/0115095 A1* | 6/2006 | Giesbrecht et al. | 381/66 |
| 2006/0222172 A1* | 10/2006 | Chhetri et al. | 379/406.05 |
| 2007/0165871 A1* | 7/2007 | Roovers et al. | 381/66 |
| 2008/0002833 A1* | 1/2008 | Kuster | 381/63 |
| 2008/0300869 A1* | 12/2008 | Derkx et al. | 704/226 |

OTHER PUBLICATIONS

Shoji Makino and Yoichi Haneda,Subband Echo Canceler with an Exponentially weighted stepsize NLMS Adaptive Filter, 1999,Electronic and Communications in Japan, Part 3, vol. 82,No. 3,pp. 49-57.*

Shoji Makino and Yutaka Kaneda ,Exponentially Weighted stepsize NLMS Adaptive Filter Based on the Statistics of a Room Impulse Response, IEEE Transactions on Speech and audio Processing , vol. 1,No. 1,Jan. 1993,pp. 101-108.*

Enzner et al, Partitioned residual echo power estimation for frequency domain acoustic echo cancellation and postfiltering, European Transaction on telecom, vol. 13, No. 2, Mar. 2002.*

Martin et al, combined acoustic echo cancellation dereverberation and noise reduction a two microphone approach, 1994.*

Mahieux et al, comparison of dereverberation techniques for videoconferencing applications, aes,1996.*

Enzner et al, Partioned residual echo power estimation for frequency domain acoustic echo cancellation and postfiltering,2002.*

Lebart, K. et al., "A New Method Based on Spectral Subtraction for Speech Dereverberation," *acts acustica—ACUSTICA* 2001, vol. 87, pp. 359-366.

Schroeder, M. R., "New Method of Measuring Reverberation Time," XP-002429121, pp. 409-412.

* cited by examiner

DEREVERBERATION SYSTEM FOR USE IN A SIGNAL PROCESSING APPARATUS

BACKGROUND OF THE INVENTION

1. Priority Claim

This application claims the benefit of priority to EP 06016029.8, filed Aug. 1, 2006, which is incorporated herein by reference.

2. Technical Field

The present inventions relate to a dereverberation system for use in a signal processing apparatus and, more particularly, to a dereverberation system that may be used in a loudspeaker-room-microphone environment.

3. Related Art

Signal processing systems are used in many applications. One set of applications includes speech signal processing/recognition, where the signal processing system may be used to enhance the intelligibility of the speech signals. Another application is the enhancement of the quality of signals transmitted and/or received in a communication system. Signal processing in these systems may be used for noise reduction as well as echo compensation.

A microphone may be used in a reverberant environment. A microphone used in such environments may detect audio signals that are generated by an audio source directly and delayed reflections. The signals received at the microphone may be smeared over time as a result of the environmental acoustics that generate a reverb response. Reverberation signals at a microphone are noticeable in an office, a vehicle, dealer cabin, or other enclosed space, and may reduce the intelligibility of the desired microphone signal, such as a target speech signal.

One method of dereverberating a microphone signal is deconvolution. In this method, the microphone signal is inverse filtered using an estimate for the acoustic channel response. Accurate dereverberation depends on an accurate estimate of the acoustic channel response, which can be difficult to ascertain.

Another method of dereverberating the microphone signal process the direct-path speech signal uses pitch enhancement or a predictive coding. This method is a multi-channel approach that averages multiple microphone signals to obtain a reduction of the reverberation contribution to the processed signal. However, implementation of this multi-channel approach may be expensive and require many hardware components. Although various dereverberation systems have been contemplated, the contemplated systems suffer from various deficiencies.

SUMMARY

A system used in a loudspeaker-room-microphone environment includes a microphone signal partitioner that divides a signal from a microphone into one or more divided portions. A reverberation energy estimator estimates reverberation energy in some of the divided portions of the microphone signal based on a loudspeaker signal. The estimated reverberation energy is processed to generate a dereverberated output signal.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
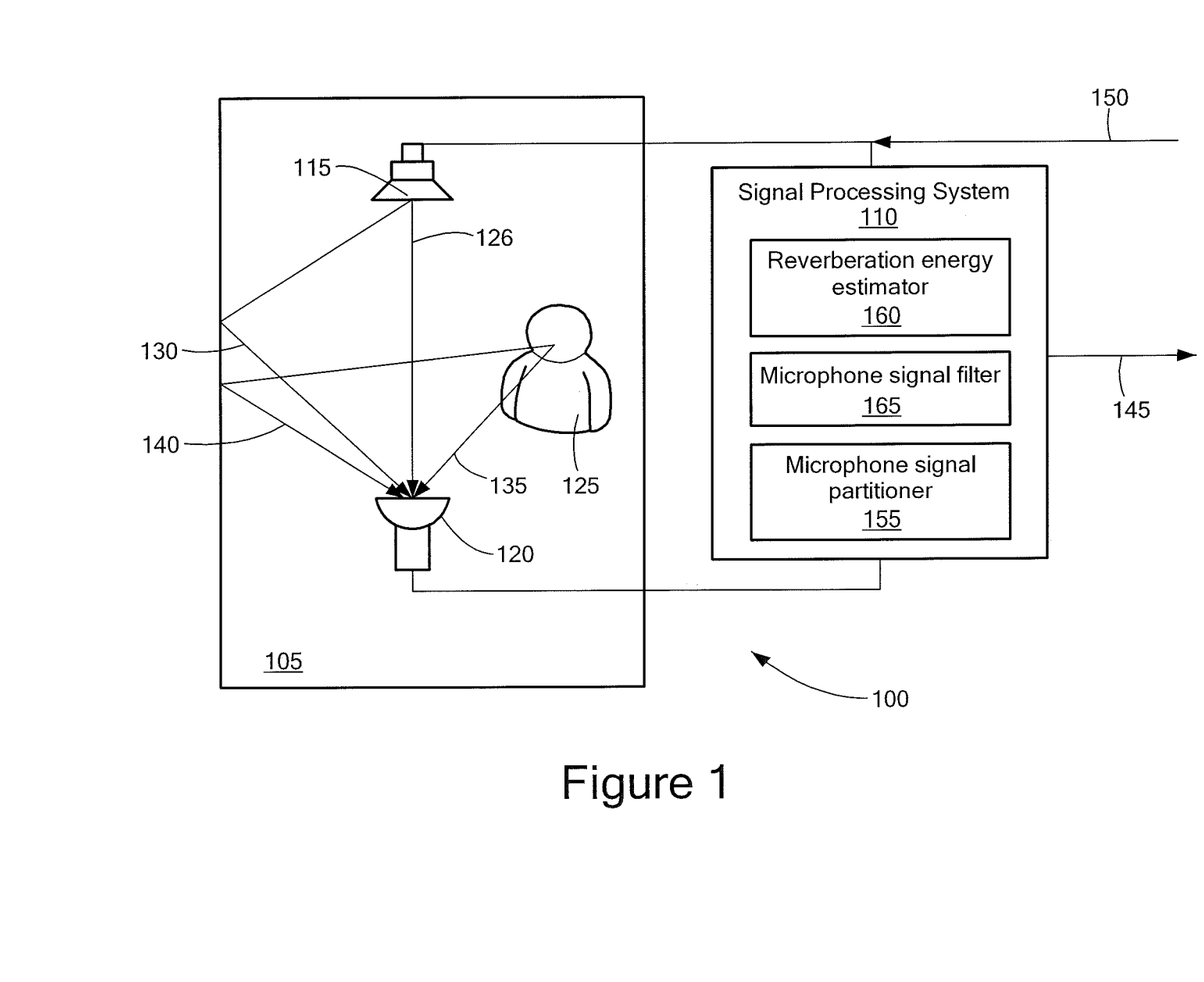
FIG. 1 is a diagram of a system that dereverberates a microphone signal.

FIG. 1 is a diagram of a system 100 that includes a reverberant environment 105 and a signal processing system 110. The reverberant environment 105 may be an enclosed environment, such as an office, a vehicle cabin, or an enclosed environment having finite acoustic characteristics. An audio system is set up in the reverberant environment 105. The audio system may include one or more loudspeakers 115 and one or more microphones 120 that are maybe used by a speaker 125.

The microphone 120 receives direct signals and indirect reverberant signals that may interfere with the intelligibility of desirable direct signals. Audio provided by the output of loudspeaker 115 may include a portion 126 that is directly communicated through environment 105 and a portion 130 that is indirectly communicated through environment 105 as a result of reflections within the environment 105. Speech signals provided by speaker 125 may include a portion 135 that is directly communicated through environment 105 and a portion 140 that travels through environment 105 due to reflections in the environment 105.

The signal processing system 110 processes the signal from microphone 120 to generate a processed output signal 145. The output signal 145 includes the desired direct audio 135 provided by speaker 125 while suppressing the reverberant signals that may be generated in environment 105. In FIG. 1, the signal processing system 110 dereverberates the signal received from microphone 120 based, at least in part, on a loudspeakers signal at 150.

The signal from microphone 120 is converted to a digital format by an analog-to-digital connector within or separate from the signal processing system 110 at a microphone signal partitioner 155. The microphone signal partitioner is adapted to divide the signal from the microphone into one or more divided portions. The microphone signal may be transformed into the frequency domain and subsequently divided into time frames. Alternatively, the microphone signal may be divided into time frames and subsequently transformed for processing in the frequency domain. The overall processing may be performed in the frequency domain. Processing may also occur after filtering the microphone signal using filter banks to divide the microphone signal into sub-band signals. The overall processing may be performed in the time domain with the microphone signal divided into individual time frames.

The signal processing system 110 may estimate the reverberation energy in at least some frames or sub-bands provided by the microphone signal partitioner 155. Reverberation energy may correspond to the squared magnitude of the unwanted reverberant signal portion present in the microphone signal. The estimated reverberation energy may be subtracted from the signal provided by microphone 120 to remove at least some part of the unwanted reverberant signal portion. Processing for dereverberation is not necessary for all of the divided portions. In some instances, the first frames/portions almost exclusively exhibit the desired speech signal without the corresponding reverberation signal portion.

The signal processing system 110 may include a reverberation energy estimator to estimate the reverberation energy in at least some of the divided portions of the microphone signal. The estimated reverberation energy may be calculated, at least in part, on the basis of at least one loudspeaker signal 150. The reverberation energy estimator 160 may use the loudspeakers signal 150 to estimate the impulse response of the loudspeaker-room-microphone in environment 105. In FIG. 1, the original loudspeaker signal at 150 is received by the signal processing system 110 and the loudspeaker 115 where it is transduced into an audio signal in environment 105 and may be detected by microphone 120. The loudspeaker signal at 150 may be a reference signal that can be used to estimate the reverberation energy characteristics of environment 105.

There are several ways of using the loudspeaker signal 150 to estimate the reverberation energy. Given the loudspeaker signal 150 on the one hand and the microphone signal in the other, the impulse response of the loudspeaker-room-microphone environment 105 may be determined. From the impulse response, the reverberation energy may be derived. The unwanted reverberant signal portion of a microphone signal may be represented as $$r(n) = \sum_{l=D_t}^{\infty} x_c(n-l)h(l),$$

with the discrete time index n, the loudspeaker signal $x_c(n)$ and the impulse response of the loudspeaker-room-microphone system h(n). The sum starts with some discrete time value $D_t$ indicating the beginning of reverberant portions of the acoustic signal detected at microphone 120 causing the reverberation. For a time interval up to $D_t$ the microphone signal is dominated by the energy of the desired signal.

One way of estimating the impulse response of environment 105 is by incorporating an adaptive filter in the reverberation energy estimator 160. The adaptive filter filters the microphone signal so that the automatic adaptation of the filter coefficients results in filter coefficients that model the impulse response. The impulse response of the loudspeaker-room-microphone system is determined from the adapted filter coefficients of the adaptive filter.

The signal processing system 110 uses a microphone signal filter 165 that is adapted to apply a filter to one or more of the divided portions of the microphone signal on the basis of the estimated reverberation energy as determined by the reverberation energy estimator 160. The filtered signal is provided at output 145. The output signal at 145 includes the desired direct audio 135 provided by speaker 125 while the reverberant signals produced in environment 105 are suppressed.

The filtering of the microphone signal by filter 165 on the basis of the estimated reverberation energy of the at least some of the frames or sub-bands may be performed through a Wiener filter. Other filters such as a magnitude filter may also be used. When filtering the microphone signal in the frequency domain, the microphone signal may be Fourier transformed to obtain Fourier transformed signals $Y_\mu(k)$, where k and $\mu$ denote the frame number and the index of the frequency bin, respectively. The microphone signal may be Fourier transformed before it is divided into frames or it may be divided into frames followed by Fourier transformations of each frame. At least some of the Fourier transformed signals $Y_\mu(k)$ may be filtered using the Wiener filter $W_\mu(k)=1-|\hat{R}_\mu(k)|^2/|Y_\mu(k)|^2$ to obtain filtered signals $\hat{X}_\mu(k)$ according to $\hat{X}_\mu(k)=W_\mu(k)Y_\mu(k)$, where $|\hat{R}_\mu(k)|^2$ denotes the estimated reverberation energy of the at least some of the frames.

The signal processing may be performed for sub-band signals obtained from the microphone signal using a filter bank in the microphone signal partitioner 155. In such instances, the microphone signal is filtered by the filter-bank to obtain sub-band signals $Y_\mu(k)$, where k and $\mu$ denote the time index of the sub-sampled microphone signal that is filtered by the filter-bank and the index of the sub-band, respectively. At least some of the sub-band signals $Y_\mu(k)$ are filtered using the Wiener filter $W_\mu(k)=1-|\hat{R}_\mu(k)|^2/|Y_\mu(k)|^2$ to obtain filtered signals $\hat{X}_\mu(k)$ according to $\hat{X}_\mu(k)=W_\mu(k)Y_\mu(k)$, where $|\hat{R}_\mu(k)|^2$ denotes the estimated reverberation energy of at least some of the sub-bands.

The reverberation energy $|\hat{R}_\mu(k)|^2$ of at least some of the frames or sub-bands may be estimated according to the following formula:

$$|\hat{R}_\mu(k)|^2 = |Y_\mu(k-D)|^2 A_\mu \exp(-\gamma_\mu D) + |\hat{R}_\mu(k-1)|^2 \exp(-\gamma_\mu)$$

where D is a predetermined delay, $A_\mu$ is an amplitude representing the ratio of direct-path energy to reverberation energy, $\gamma_\mu$ is a parameter determined on the basis of at least one loudspeaker signal, k denotes the frame number or the time index of the sub-sampled microphone signal, and $\mu$ denotes the index of the frequency bin or the index of the sub-band, respectively. The predetermined delay may compensate or take into account that the initial part of the microphone signal is dominated by the direct acoustic path, e.g., a significant reverberant signal portion is present after some delay D, e.g. D≈30 ms. The predetermined amplitude $A_\mu$ may, in principle, be estimated when the position of the speaker 125 relative to the loudspeaker 115 is known. This position may be estimated by a beamforming of microphone signals obtained from a microphone array or other ways. $A_\mu$ can be chosen as a real value of the range from about 0.1 to about 0.5.

The parameter $\gamma_\mu$ may be determined in the time domain (e.g., obtain a quick valuation), in the frequency domain, or the sub-band frequency domain. When determined in the frequency domain or the sub-band frequency domain it may be averaged over frequencies or sub-bands in order to obtain an averaged parameter $\gamma_\mu$ that does not substantially depend on the frequency.

If an adaptive filter is used in the reverberation energy estimator 160, the parameter $\gamma_\mu$ may be determined from the filter coefficients. The reverberation time $T_{60}$, which may correspond to the time it takes for the reverberation signal to decay by about 60 dB, may be estimated form the energy decay curve ($EDC_L(n)$) given by the filter coefficients $\hat{h}_L(n)$ of the adaptive filter. This corresponds to the following equation:

$$EDC_L(n) = \frac{\sum_{i=n}^{L_L}|\hat{h}_L(i)|^2}{\sum_{i=0}^{L_L}|\hat{h}_L(i)|^2}$$

where $L_L$ denotes the length of the adaptive filter. The slope of the $EDC_L(n)$ is related (inversely proportional) to the reverberation time $T_{60}$.

The parameter $\gamma_\mu$ may be calculated as a function of the reverberation time and a subsampling rate $R_S$ by which the microphone signal is sub-sampled by the microphone signal partitioner 155 for frame or sub-band processing. For example, one equation that may be used is $\gamma_\mu = 6 \ln 10\, R_S/T_{60} f_S$, where $f_S$ denotes the sampling rate of the microphone signal in the time domain.

Figure 2:
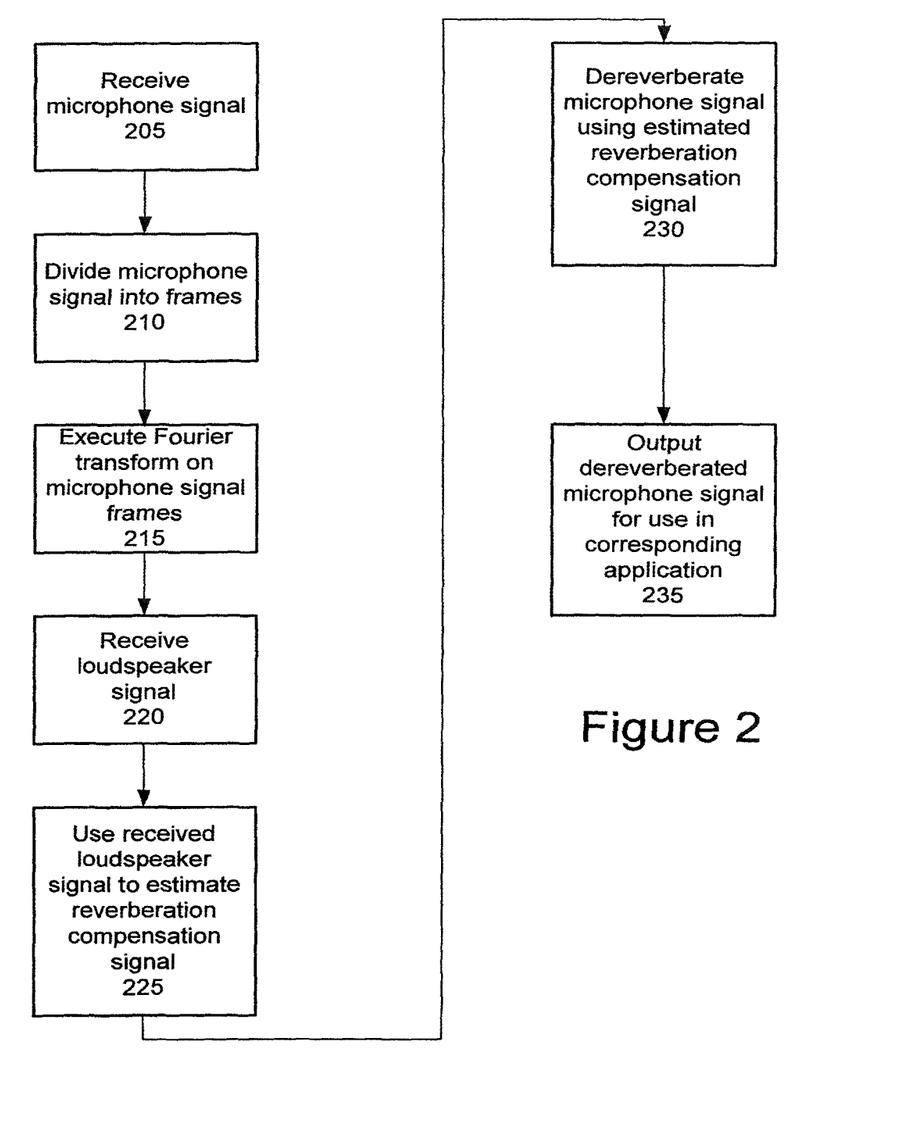
FIG. 2 is a process that may dereverberate a microphone signal.

FIG. 2 is a process that may dereverberate a microphone signal. At 205, the process receives the microphone signal. The microphone signal is divided into time frames at 210. Each time frame is subject to a Fourier transform operation, such as an STFT, at 215.

At 220, the process receives a loudspeaker signal. The loudspeaker signal may be used to derive or estimate a reverberation compensation signal at 225. The estimated reverberation compensation signal is applied to at least some of the Fourier transformed microphone signals at 230. Application of the estimated reverberation compensation signal results in a dereverberated microphone output signal that includes the desired target microphone signal, while suppressing reverberant portions of the microphone signal. The dereverberated microphone output signal is provided to a target application at 235. The target application may include a transceiver of a vehicle communications system, a speech recognition system, or a process or system that enhances a microphone signal.

Figure 3:
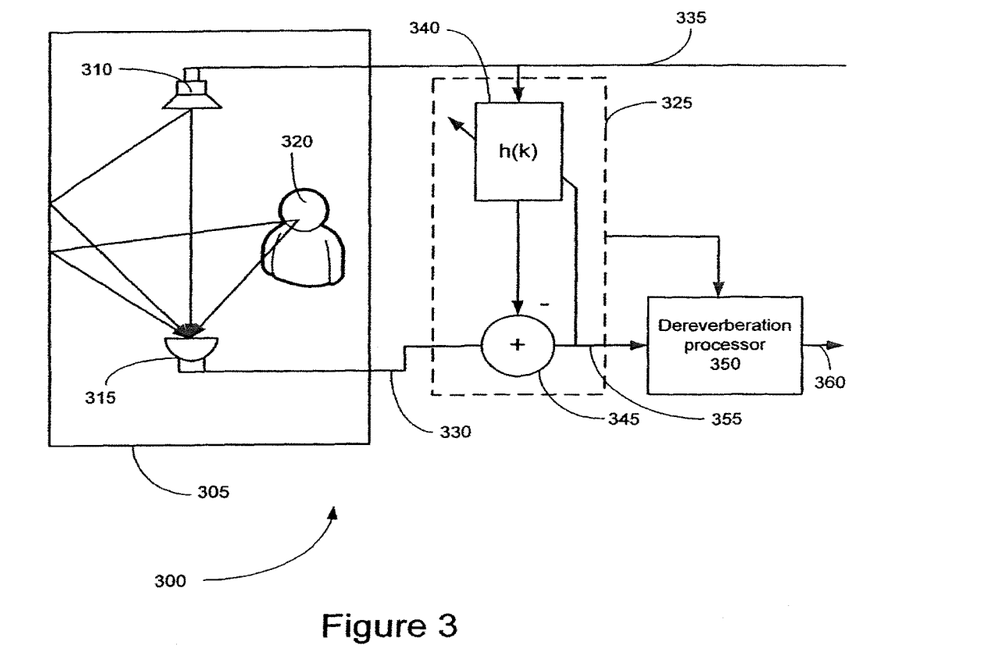
FIG. 3 is another system that dereverberates a microphone signal.

FIG. 3 is a diagram of another system 300 in which a microphone signal is dereverberated. System 300 includes a reverberant environment 305 having one or more loudspeakers 310, one or more microphones 315, and a speaker 320. The microphone 315 may receive direct and reflective signals. The analog or digital signals generated by microphone 315 may include target signals and unwanted reverberant signals.

System 300 includes an echo canceller 325 that is adapted to receive microphone signals at 330 and a loudspeaker signal at 335. The echo canceller 325 includes an adaptive filter 340 and a combiner 345. A dereverberation processor 350 receives the filter coefficients of filter 340. Once the coefficients of filter 340 converge, they correspond to the impulse response of the loudspeaker-room-microphone environment 305 and may be used by the dereverberation processor to filter reverberant components from the signal at 355. The dereverberated signal at 360 includes the desired target signals received by microphone 315 unwanted reverberant signals are suppressed.

Figure 4:
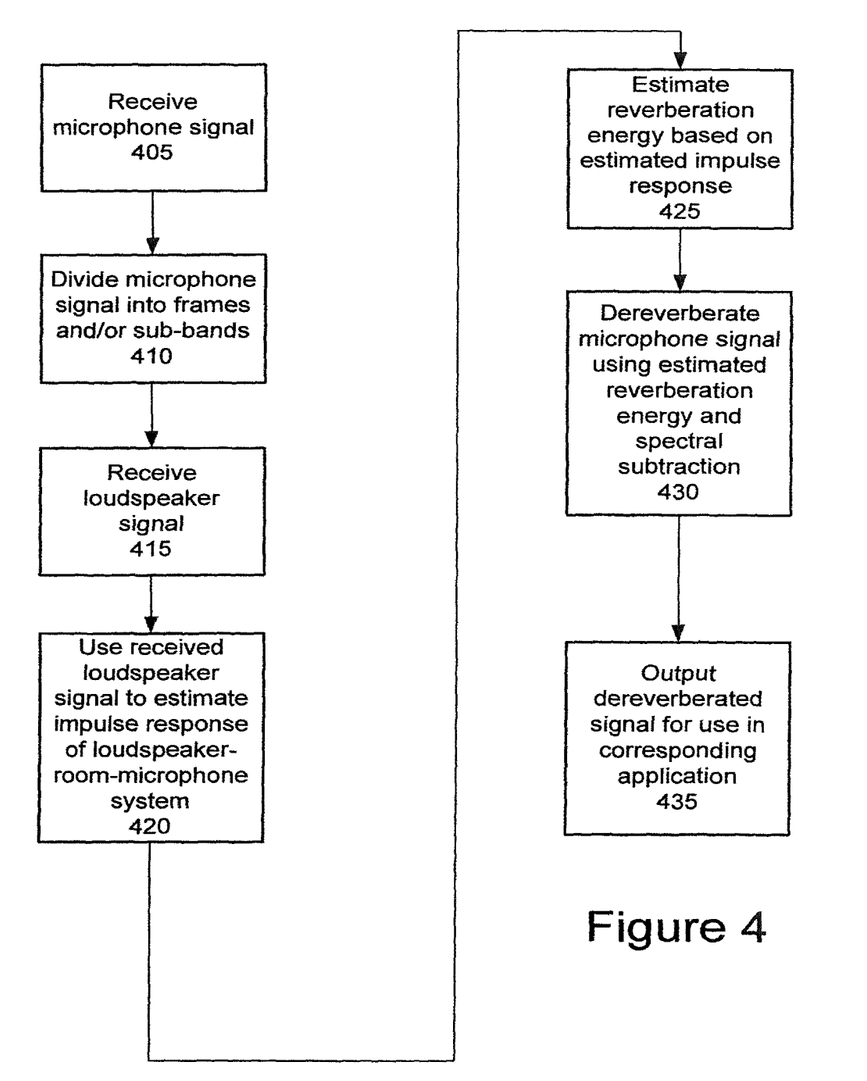
FIG. 4 is another process that dereverberates a microphone signal.

FIG. 4 shows a further process that may be used by a system to dereverberate a microphone signal. At 405, the system receives the microphone signal. The microphone signal is divided into time frames and/or sub-bands at 410. At 415, the system receives a loudspeaker signal. The loudspeaker signal is used at 420 to estimate the impulse response of the loudspeaker-room-microphone environment.

An adaptive echo canceller may estimate the impulse response of the loudspeaker-room-microphone environment. The filter coefficients of the echo cancellation canceller are automatically adjusted to model the impulse response of the loudspeaker-room-microphone system.

Due to the effect of reverberation, the acoustic spectrum detected by the microphone is smeared over time. The smearing of the energy of the microphone signal can be modeled by $$|Y_\mu(k)|^2 \approx \sum_{l=0}^{\infty}|X_{c,\mu}(k-l)|^2 G_\mu(l) \approx |X_\mu(k)|^2 + |R_\mu(k)|^2$$

where $X_{c,\mu}$ is the Fourier transformed signal emitted by the speaking person (clean speech signal), $G_\mu$ models the energy decay of the impulse response of the loudspeaker-room-microphone system in the frequency domain. In this example, it may be assumed that the wanted signal $X_\mu(k)$ and the reverberation signal portion $R_\mu(k)$ are uncorrelated. The energy decay comprises a first part corresponding to a number of initial frames, D frames, that exhibit no significant reverberation and a further part contributing to the reverberation signal portion:

$$|R_\mu(k)|^2 \approx \sum_{l=D}^{\infty}|X_{c,\mu}(k-l)|^2 G_\mu(l).$$

The reverberation energy may be used in a spectral subtraction filtering of the microphone signal. Assuming an exponential decay of the reverberation energy for $k>0$ (and $G_\mu(k)=1$ for $k=0$) the reverberation energy may be represented as follows:

$$|R_\mu(k)|^2 \approx \sum_{l=D}^{\infty}|X_{c,\mu}(k-l)|^2 A_\mu \exp(-y_\mu l) =$$

$$\sum_{m=-\infty}^{k-D}|X_{c,\mu}(m)|^2 A_\mu \exp(-y_\mu(k-m)) = |X_{c,\mu}(k-D)|^2 A_\mu \exp(-y_\mu D) +$$

$$\sum_{m=-\infty}^{k-1-D}|X_{c,\mu}(m)|^2 A_\mu \exp(-y_\mu(k-1-m))\exp(-y_\mu) =$$

$$|X_{c,\mu}(k-D)|^2 A_\mu \exp(-y_\mu D) + |R_\mu(k-1)|^2 \exp(-y_\mu)$$

where D is a fixed delay by D frames and $\gamma_\mu$ denotes the exponential decay parameter depending on room parameters as, e.g., the room size and absorption characteristics. The parameter $A_\mu$ denotes the ratio of the energy of the direct acoustic path from a source to the microphone to the reverberation energy that may depend on the position of a sound source or a speaking person relative to the microphone.

Approximating the speaking person's clean speech signal as $|X_{c,\mu}(k-D)|^2$ by the reverberated microphone signal $|Y_\mu(k-D)|^2$ an estimate for the reverberation energy can be calculated by the recursive formula $$|\hat{R}_\mu(k)|^2 = |Y_\mu(k-D)|^2 A_\mu \exp(-\gamma_\mu D) + |\hat{R}_\mu(k-1)|^2 \exp(-\gamma_\mu).$$

The exponential decay parameter $\gamma_\mu$ may be determined in the time domain. The echo canceller may be used to filter the microphone signal. The reverberation time $T_{60}$, which may correspond to the time that is needed for the reverberation to decay by about 60 dB, is estimated from the energy decay curve ($EDC_L(n)$) given by the filter coefficients $\hat{h}_L(n)$ of the echo canceller after convergence of the adaptation algorithm $$EDC_L(n) = \frac{\sum_{i=n}^{L_L} |\hat{h}_L(i)|^2}{\sum_{i=0}^{L_L} |\hat{h}_L(i)|^2}$$

where $L_L$ denotes the length of the adaptive filter used in the echo canceller. The $EDC_L(n)$ value may represent the total amount of signal energy remaining in the reverberation impulse response at time n.

The slope of the $EDC_L(n)$ may be estimated. An upper and a lower threshold for a range of values of the $EDC_L(n)$, e.g., $E_{max}=-20$ dB and $E_{min}=-40$ dB, may be chosen. The discrete time indices $n_1$ and $n_2$ are determined for which the $EDC_L(n)$ exhibits values closest to $E_{max}$ and $E_{min}$, respectively. The reverberation time $T_{60}$ may be determined by extrapolation of the slope of the $EDC_L(n)$:

$$T_{60} = \frac{1}{f_s} \frac{n_2 - n_1}{E_{max} - E_{min}} 60 \, dB$$

where $f_S$ denotes the sampling rate of the digital microphone signal in the time domain. Given an exponential decay of the reverberation energy $\exp(-\gamma_\mu k)$ an energy decrease by $10^{-6}$ (after the reverberation time $T_{60}$) implies $\exp(-\gamma_\mu T_{60} f_S/R_S)=10^{-6}$, where $R_S$ denotes a subsampling rate of the processed microphone signal (divided into frames or sub-blocks) due to the frame based or sub-block based processing. Accordingly, the exponential decay parameter is given by $$\gamma_\mu = \frac{6 \ln 10}{T_{60} f_s} R_s.$$

From the foregoing, an estimate of the reverberation energy based on the impulse response may be determined.

The estimated reverberation energy is used at 430 for spectral subtraction to obtain a dereverberated microphone signal. The spectral subtraction may be performed using a Wiener filter. The microphone signal in each frame $Y_\mu(k)$ may include two uncorrelated parts (other contributions as, e.g., ambient noise are neglected here for simplicity): the wanted signal $X_\mu(k)$ and the reverberant signal contribution $R_\mu(k)$ where k and $\mu$ denote the frame number and the index of the frequency bin.

In the spectral subtraction operation used to achieve the dereverberated microphone signal $\hat{X}_\mu(k)$, the amplitudes of the microphone signal in each frame $Y_\mu(k)$ are scaled with real valued coefficients $W_\mu(k)$: $\hat{X}_\mu(k)=W_\mu(k) Y_\mu(k)$. A Wiener filter may be used having the coefficients $W_\mu(k)$:

$$\hat{X}_\mu(k) = \left(1 - \frac{|\hat{R}_\mu(k)|^2}{|Y_\mu(k)|^2}\right) Y_\mu(k).$$

with $\hat{R}_\mu(k)$ being determined by the above recursion formula.

The signal $\hat{X}_\mu(k)$ is output at 435. The output signal may represent an enhanced microphone signal that is to be transmitted to a remote communication party in a hands-free telephony system. It may also represent an enhanced speech input for a speech recognition or voice control system.

Figure 5:
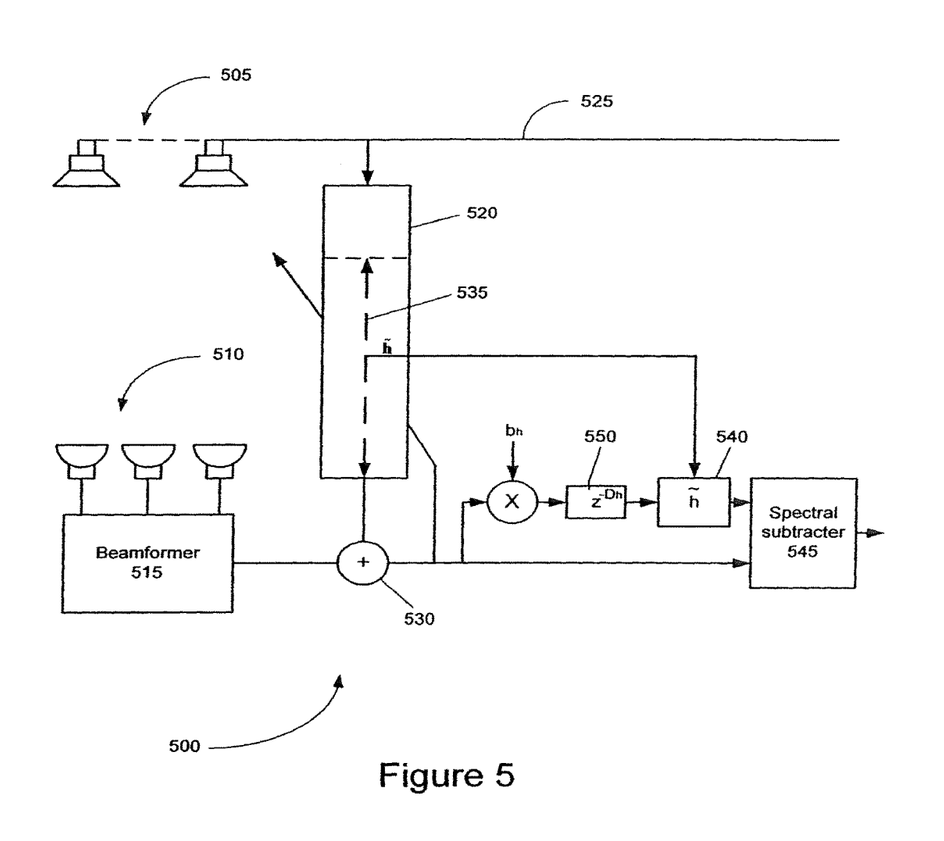
FIG. 5 is another system that dereverberates a microphone signal.

FIG. 5 is a diagram of another system 500 that processes a reverberation of a microphone signal. System 500 includes one or more loudspeakers 505, at least two microphones 510, a beamformer 515 and an adaptive filter 520. The adaptive filter 520 is in communication with a loudspeaker signal 525. A combiner 530 is in communication with the output of beamformer 515 and adaptive filter 520. The beamformer 515 may be a delay-and-sum beamforming system.

The system configuration shown in FIG. 5 may be used to directly estimate the reverberation energy within a microphone signal that is divided into frames without necessarily making use of the above-noted recursion formula. The adaptive filter 520 includes filter coefficients that model the impulse response of the loudspeaker-room-microphone system after convergence of the adaptation algorithm has been reached. For the direct estimate of the reverberation energy a subset $\tilde{h}$ of the complete set of filter coefficients $\hat{h}$ of the adaptive filter 520 are used. The subset $\tilde{h}$ is selected to match the time section that corresponds to the reverberation tail. This subset is extracted and passed to another filter 540. Filter 540, therefore, passes signals corresponding to the unwanted portions of the microphone signal.

By filtering the beamformed microphone signal with filter 540, an estimate for the reverberant signal portion of the beamformed microphone signal and an estimate of the reverberation energy may be obtained. The output of the filter 540 and the beamformed microphone signal are provided to the input of a spectral subtractor 545.

In this example, and in some of the examples described, it has been assumed that the impulse response of the loudspeaker-to-microphone environment is similar to the one from the speaking person. Consequently, if a plurality of loudspeakers are present, the loudspeaker signal corresponding to the loudspeaker that is closest to the speaking person may be chosen for an estimate of the impulse response of the loudspeaker-room-microphone system $\hat{h}$.

To obtain a reliable estimate for the reverberation energy, the acoustic time delays may be matched to the subset of filter coefficients $\tilde{h}$ chosen for estimating the reverberant portion of the beamformed microphone signal. Thus, the subset of filter coefficients $\tilde{h}$ may be delayed by $D_h$ samples using, for example, delay line 545. In addition, the energy of the estimated reverberation energy may be adjusted by some factor $b_h$.

The parameters $D_h$ and $b_h$ may be optimized if the actual position of the person uttering speech signals relative to the microphones 510 is known. In FIG. 5, this position may be determined by using a source localization algorithm in the beamformer 515.

Figure 6:
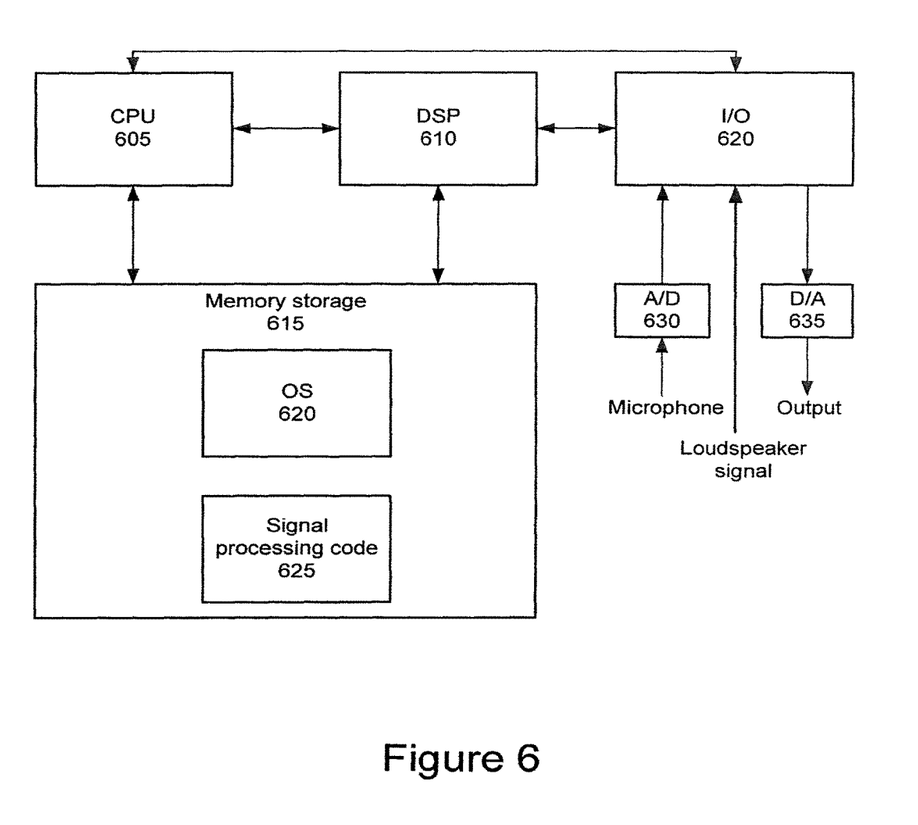
FIG. 6 is a diagram of a platform that may be used to dereverberate a microphone signal.

The described systems may be implemented in software, hardware, or a combination of software and hardware. One example of the platform on which the signal processing systems may be implemented is shown in FIG. 6. In FIG. 6, a CPU 605 is in communication with a digital signal processing core 610, memory storage 615, and I/O circuitry 620. Memory storage 615 may include operating system code 625 and signal processing code 630 providing the signal processing instructions used to configure the manner in which the signal processing system is to operate. Memory storage 615 may be arranged to include networked memory, random access memory, and other memory types to meet system applications or demands.

In FIG. 6, a continuous time domain signal is provided to the input of an analog-to-digital converter 630 to generate digital input signals for processing. Similarly, the processed digital output signals may be provided to the input of a digital-to-analog converter 635 to generate a continuous output signal in the time domain.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for use in a loudspeaker-room-microphone environment, the system comprising:
    a microphone signal partitioner adapted to divide a microphone signal into one or more divided portions;
    an echo cancellation filter adapted to filter an echo component of one or more divided portions of the microphone signal on the basis of at least one loudspeaker signal;
    a reverberation energy estimator adapted to estimate reverberation energy in at least some of the one or more divided portions of the microphone signal on the basis of the at least one loudspeaker signal; and
    a microphone signal filter adapted to filter one or more divided portions of the microphone signal on the basis of the estimated reverberation energy as determined by the reverberation energy estimator,
    wherein the reverberation energy estimator estimates the reverberation energy of speech signals in the loudspeaker-room-microphone environment and the echo cancellation filter removes echo components of a loudspeaker that receives the at least one loudspeaker signal in the loudspeaker-room-microphone environment.

2. The system of claim 1, where the reverberation energy estimator is adapted to estimate the reverberation energy based on an estimation of an impulse response of the loudspeaker-room-microphone environment.

3. The system of claim 2, the wherein the echo cancellation filter estimates the impulse response of the loudspeaker-room microphone environment.

4. The system of claim 2 wherein the microphone signal filter employs filter coefficients determined from the at least one adapted filter coefficients of the echo cancellation filter.

5. The system of claim 4, wherein the filter coefficients of the microphone signal filter represents an impulse response of the loudspeaker-room-microphone environment corresponding to a reverberation tail of the microphone signal.

6. The system of claim 4, wherein the filter coefficients of the microphone signal filter consist of filter coefficients corresponding to the impulse response of the loudspeaker-room microphone environment.

7. The system of claim 1, wherein the echo cancellation filter includes at least one adaptable filter coefficients and wherein the reverberation energy estimator estimates the reverberation energy from the at least one adapted filter coefficients.

8. The system of claim 1, where the microphone signal partitioner transforms the microphone signal into the frequency domain signals and subsequently divides the frequency domain signals into frames.

9. The system of claim 1, where the microphone signal partitioner divides the microphone signal by time period and subsequently transforms each period of the microphone signal into a frequency domain creating frequency domain signals for each time period.

10. The system of claim 1, where the microphone signal partitioner is adapted to Fourier transform the microphone signal to obtain Fourier transformed signals $Y_\mu(k)$, where k and $\mu$ denote the frame number and the index of the frequency bin, respectively; and
    where the reverberation energy estimator filters at least some of the Fourier transformed signals $Y_\mu(k)$ using a Wiener filter $$W_\mu(k) = 1 - |\hat{R}_\mu(k)|^2/|Y_\mu(k)|^2 W$$

to obtain filtered signals $\hat{X}_\mu(k)$ according to $\hat{X}_\mu(k) = W_\mu(k) Y_\mu(k)$, where $|\hat{X}_\mu(k)|^2$ denotes the estimated reverberation energy in at least some of the one or more divided portions of the microphone signal.

11. The system of claim 1, where the microphone signal partitioner is adapted to filter the microphone signal using a filter-bank to obtain sub-bend signals $Y_\mu(k)$, where k and $\mu$ denote the time index of the sub-sampled microphone signal that is filtered by the filter-bank and the index of the sub-band, respectively; and where the reverberation energy estimator filters at least some of the sub-band signals $Y_\mu(k)$ using a Wiener filter $W_\mu(k) = 1 - |\hat{R}_\mu(k)|^2/|Y_\mu(k)|^2 W$ to obtain filtered signals $\hat{X}_\mu(k)$ according to $\hat{X}_\mu(k) = W_\mu(k) Y_\mu(k)$, where $|\hat{R}_\mu(k)|^2$ denotes the estimated reverberation energy in at least some of the one or more divided portions of the microphone signal.

12. The system of claim 1, where the reverberation energy estimator determines the estimated reverberation energy $|\hat{R}_\mu(k)|^2$ of the one or more divided portions of the microphone signal recursively according to the following formula $$|\hat{R}_\mu(k)|^2 = |Y_\mu(k-D)|^2 A_\mu \exp(-\gamma_\mu D) + |\hat{R}_\mu(k-1)|^2 \exp(-\gamma_\mu)$$

where D is a predetermined delay, $A_\mu$ is a predetermined amplitude and $\beta_\mu$ is a parameter determined on the basis of the at least one loudspeaker signal, and where k denotes the frame number or the time index of the one or more divided portions of the microphone signal, respectively, and $\mu$ denotes the index of the frequency bin or the index of a sub-band of the one or more divided portions of the microphone signal, respectively.

13. The system of claim 12, where the reverberation energy estimator estimates a reverberation time $T_{60}$ and where the parameter $\gamma_\mu$ is calculated as a function of the estimated reverberation time $T_{60}$ and a subsampling rate $R_S$ by which the microphone signal is divided by the microphone signal partitioner.

14. The system of claim 13, where the reverberation energy estimator calculates $\gamma_\mu$ according to the formula $\gamma_\mu = 6 \ln 10 R_S/T_{60} f_S$, where $f_S$ corresponds to a sampling rate of the microphone signal in the time domain employed by the microphone signal partitioner.

15. A system for use in a loudspeaker-room-microphone environment, the system comprising:
    microphone signal partitioning means for dividing a microphone into one or more divided portions;
    echo cancellation means for filtering echo components of one or more divided portions of the microphone signal on the basis of at least one loudspeaker signal;
    reverberation energy estimator means for estimating reverberation energy in at least some of the one or more divided portions of the microphone signal on the basis of the at least one loudspeaker signal; and
    microphone signal filter means for filtering one or more divided portions of the microphone signal on the basis of the estimated reverberation energy as determined by the reverberation energy estimator means,
wherein the reverberation energy estimator means estimates the reverberation energy of speech signals in the loudspeaker-room-microphone environment and the echo cancellation filter removes echo components of the loudspeaker in the loudspeaker-room-microphone environment.

16. The system of claim 15, where the reverberation energy estimator means is adapted to estimate the reverberation energy based on an estimation of an impulse response of the loudspeaker-room-microphone environment.

17. The system of claim 15,
wherein the echo cancellation means includes at least one adaptable filter coefficient and wherein the reverberation energy estimator estimates the reverberation energy from adapted filter coefficients of the echo cancellation filter.

18. The system of claim 15,
wherein the echo cancellation filter includes at least one filter coefficient and wherein the reverberation energy estimator means estimates the impulse response of the loudspeaker-room-microphone environment from the adapted filter coefficients of the echo cancellation filter.

19. The system of claim 15, wherein the microphone signal partitioner means transforms the microphone signal into frequency domain signal and subsequently divides the frequency domain signals into frames.

20. The system of claim 15, wherein the microphone signal partitioner means divides the microphone signal by time period and subsequently transforms each period of the microphone signal into a frequency domain creating frequency domain signals for each time period.

21. The system of claim 15 wherein the microphone signal filter means employs filter coefficients determined from the at least one adapted filter coefficients of the echo cancellation filter.

22. The system of claim 21, wherein the filter coefficients of the microphone signal filter means represents an impulse response of the loudspeaker-room-microphone environment corresponding to a reverberation tail of the microphone signal.

23. The system of claim 21, wherein the filter coefficients of the microphone signal filter means consist of filter coefficients corresponding to the impulse response of the loudspeaker room-microphone environment.

24. The system of claim 15, where the microphone signal partitioner means is adapted to Fourier transform the microphone signal to obtain Fourier transformed signals $Y_\mu(k)$, where k and μ denote the frame number and the index of the frequency bin, respectively; and where the reverberation energy estimator means filters at least some of the Fourier transformed signals $Y_\mu(k)$ using a Wiener filter $W_\mu(k)=1-|\hat{R}_\mu(k)|^2/|Y_\mu(k)|^2$ W to obtain filtered signals $\hat{X}\mu(k)$ according to $\hat{X}_\mu(k)=W_\mu(k) Y_\mu(k)$, where $|\hat{R}_\mu(k)|^2$ denotes the estimated reverberation energy in at least some of the one or more divided portions of the microphone signal.

25. The system of claim 15, where the microphone signal partitioner means is adapted to filter the microphone signal using a filter-bank to obtain sub-band signals $Y_\mu(k)$, where k and μ denote the time index of the sub-sampled microphone signal that is filtered by the filter-bank and the index of the sub-band, respectively; and
where the reverberation energy estimator means filters at least some of the sub-band signals $Y_\mu(k)$ using a Wiener filter $W_\mu(k)=1-|\hat{R}_\mu(k)|^2/|Y_\mu(k)|^2$ W to obtain filtered signals $\hat{X}_\mu(k)$ according to $\hat{X}_\mu(k)=W_\mu(k) Y_\mu(k)$, where $|\hat{R}_\mu(k)|^2$ denotes the estimated reverberation energy in at least some of the one or more divided portions of the microphone signal.

26. The system of claim 15, where the reverberation energy estimator means determines the estimated reverberation energy $|\hat{R}_\mu(k)|^2$ of the one or more divided portions of the microphone signal recursively according to the following formula $$|\hat{R}_\mu(k)|^2=|Y_\mu(k-D)|^2 A_\mu\exp(-\gamma_\mu D)+|\hat{R}_\mu(k-1)|^2\exp(-\gamma_\mu)$$

where D is a predetermined delay, $A_\mu$ is a predetermined amplitude and $\gamma_\mu$ is a parameter determined on the basis of the at least one loudspeaker signal, and where k denotes the frame number or the time index of the one or more divided portions of the microphone signal, respectively, and μ denotes the index of the frequency bin or the index of a sub-band of the one or more divided portions of the microphone signal, respectively.

27. The system of claim 26, where the reverberation energy estimator means estimates a reverberation time $T_{60}$ and where the parameter $\gamma_\mu$ is calculated as a function of the estimated reverberation time $T_{60}$ and a subsampling rate $R_S$ by which the microphone signal is divided by the microphone signal partitioner means.

28. The system of claim 27, where the reverberation energy estimator means calculates $\gamma_\mu$ according to the formula $\gamma_\mu=6 \ln 10 R_S/T_{60}f_S$, where $f_S$ corresponds to a sampling rate of the microphone signal in the time domain employed by the microphone signal partitioner means.

29. The system of claim 15, further comprising:
a microphone array comprising at least two microphones; and
a beamformer configured to receive microphone signals from the microphones of the microphone array and to generate a beamformed microphone signal for provision to the microphone signal partitioning means.

30. A method of dereverberating a microphone signal in a loudspeaker-room-microphone environment, the method comprising:
partitioning the microphone signal into one or more divided portions;
filtering echo components of one or more divided portions of the microphone signal on the basis of at least one loudspeaker signal;
estimating reverberation energy in at least some of the one or more divided portions of the microphone signal on the basis of the at least one loudspeaker signal; and
filtering one or more divided portions of the microphone signal on the basis of the estimated reverberation energy,
wherein at least some of the estimated reverberation energy originates from speech signals in the loudspeaker-room-microphone environment.

31. The method of claim 30, where the reverberation energy is estimated based on an estimation of an impulse response of the loudspeaker-room-microphone environment.

32. The method of claim 30, wherein the reverberation energy is estimated from adapted filter coefficients of an adaptive echo cancellation filter.

33. The method of claim 32, where the reverberation energy is estimated based on the impulse response of the loudspeaker-room-microphone environment as determined from adapted filter coefficients of the adaptive echo cancellation filter.

34. The method of claim 30, where the microphone signal is transformed into the frequency domain and subsequently divided into frames.

35. The method of claim 30, where the microphone signal is divided in the time domain and subsequently transformed into the frequency domain.

36. The method of claim 30, where the microphone signal is Fourier transformed to obtain Fourier transformed signals $Y_\mu(k)$, where k and $\mu$ denote the frame number and the index of the frequency bin, respectively; and where at least some of the Fourier transformed signals $Y_\mu(k)$ are filtered using a Wiener filter $$W_\mu(k)=1-|\hat{R}_\mu(k)|^2/|Y_\mu(k)|^2 W$$

to obtain filtered signals $\hat{X}_\mu(k)$ according to $\hat{X}_\mu(k)=W_\mu(k) Y_\mu(k)$, where $|\hat{R}_\mu(k)|^2$ denotes the estimated reverberation energy in at least some of the one or more divided portions of the microphone signal.

37. The method of claim 30, where the microphone signal is filtered using a filter-bank to obtain sub-band signals $Y_\mu(k)$, where k and $\mu$ denote the time index of the filtered microphone signal that is filtered by the filter-bank and the index of the sub-band, respectively; and where at least some of the sub-band signals $Y_\mu(k)$ are filtered using a Wiener filter $W_\mu(k)=1-|\hat{R}_\mu(k)|^2/|Y_\mu(k)|^2 W$ to obtain filtered signals $\hat{X}_\mu(k)$ according to $\hat{X}_\mu(k)=W_\mu(k) Y_\mu(k)$, where $|\hat{R}_\mu(k)|^2$ denotes the estimated reverberation energy in at least some of the one or more divided portions of the microphone signal.

38. The method of claim 30, where the estimated reverberation energy $|\hat{R}_\mu(k)|^2$ of the one or more divided portions of the microphone signal recursively according to the following formula $$|\hat{R}_\mu(k)|^2=|Y_\mu(k-D)|^2 A_\mu \exp(-\gamma_\mu D)+|\hat{R}_\mu(k-1)|^2 \exp(-\gamma_\mu)$$

where D is a predetermined delay, $A_\mu$ is a predetermined amplitude and $\gamma_\mu$ is a parameter determined on the basis of the at least one loudspeaker signal, and where k denotes the frame number or the time index of the one or more divided portions of the microphone signal, respectively, and $\mu$ denotes the index of the frequency bin or the index of a sub-band of the one or more divided portions of the microphone signal, respectively.

39. The method of claim 38, where the estimated reverberation energy is determines, at least in part, using an estimated reverberation time $T_{60}$ and where the parameter $\gamma_\mu$ is calculated as a function of the estimated reverberation time $T_{60}$ and a subsampling rate $R_S$ by which the microphone signal is divided.

40. The method of claim 39, where $\gamma_\mu$ is calculated according to the formula $\gamma_\mu = 6 \ln 10 R_S/T_{60}f_S$, where $f_S$ corresponds to a sampling rate of the microphone signal in the time domain.

41. A method for dereverberating a microphone signal, comprising:
dividing the microphone signal into frames or sub-bands;
providing at least one loudspeaker signal;
filtering echo components of one or more divided portions of the microphone signal on the basis of the at least one loudspeaker signal;
estimating the reverberation energy in at least some of the frames or sub-bands on the basis of the at least one loudspeaker signal; and
filtering the microphone signal on the basis of the estimated reverberation energy of the at least some of the frames or sub-bands,
wherein at least some of the estimated reverberation energy originates from speech signals.

42. The method of claim 41, further comprising:
estimating the impulse response of a loudspeaker-room-microphone system, wherein a loudspeaker generates sound based of the at least one loudspeaker signal and at least one microphone providing the microphone signal; and
where the reverberation energy of the at least some of the frames or sub-bands is estimated on the basis of the estimated impulse response of the loudspeaker-room-microphone system.

43. The method of claim 42, further comprising filtering the microphone signal using an adaptive echo cancellation filter, the impulse response of the loudspeaker-room-microphone system being determined from the adapted filter coefficients of the adaptive echo cancellation filter.

44. The method of claim 41, where the microphone signal is Fourier transformed to obtain Fourier transformed signals $Y_\mu(k)$, where k and $\mu$ denote the frame number and the index of the frequency bin, respectively; and
at least some of the Fourier transformed signals $Y_\mu(k)$ are filtered by a Wiener filter $W_\mu(k)=1-|\hat{R}_\mu(k)|^2/|Y_\mu(k)|^2 W$ to obtain filtered signals $\hat{X}_\mu(k)$ according to $\hat{X}_\mu(k)=W_\mu(k) Y_\mu(k)$, where $|\hat{R}_\mu(k)|^2$ denotes the estimated reverberation energy of the at least some of the frames.

45. The method of claim 41, where the microphone signal is filtered by a filter-bank to obtain sub-band signals $Y_\mu(k)$, where k and $\mu$ denote the time index of the sub-sampled microphone signal that is filtered by the filter-bank and the index of the sub-band, respectively; and at least some of the sub-band signals $Y_\mu(k)$ are filtered by a Wiener filter $W_\mu(k)=1-|\hat{R}_\mu(k)|^2/|Y_\mu(k)|^2 W$ to obtain filtered signal (k) according to $\hat{X}_\mu(k)=W_\mu(k) Y_\mu(k)$, where $|\hat{R}_\mu(k)|^2$ denotes the estimated reverberation energy of the at least some of the sub-bands.

46. The method of claim 41, where the reverberation energy $|\hat{R}_\mu(k)|^2$ of the at least some of the frames or sub-blocks is recursively estimated according to the following formula:

$$|\hat{R}_\mu(k)|^2=|Y_\mu(k-D)|^2 A_\mu \exp(-\gamma_\mu D)+|\hat{R}_\mu(k-1)|^2 \exp(-\gamma_\mu)$$

where D is a predetermined delay, $A_\mu$ is a predetermined amplitude and $\gamma_\mu$ is a parameter determined on the basis of the at least one loudspeaker signal, and where k denotes the frame number or the time index of the one or more divided portions of the microphone signal, respectively, and $\mu$ denotes the index of the frequency bin or the index of the sub-band, respectively.

47. The method of claim 46, further comprising;
estimating a reverberation time $T_{60}$ and where the parameter $\gamma_\mu$ is calculated as a function of the estimated reverberation time $T_{60}$ and a subsampling rate $R_S$ by which the microphone signal is sub-sampled for frame or sub-block processing.

48. The method of claim 41, further comprising:
filtering the microphone signal using a filter having filter coefficients that are determined from adapted filter coefficients of an adaptive echo cancellation filter.

49. The method of claim 41, further comprising:
filtering the microphone signal using an adaptive filter solely having filter coefficients that represent the impulse response of the loudspeaker-room-microphone system corresponding to a reverberation tail of the microphone signal to estimate a reverberation portion of the microphone signal; and where the reverberation energy is estimated using the estimated reverberation portion of the microphone signal.

50. A system comprising:
    at least one microphone adapted to obtain a microphone signal;
    at least one loudspeaker adapted to output a loudspeaker signal;
    an echo cancellation filter adapted to filter an echo component of the microphone signal on the basis of the loudspeaker signal;
    a reverberation estimator adapted to estimate the reverberation energy of a reverberation portion in the microphone signal on the basis of the loudspeaker signal; and
    a dereverberation filter adapted to receive the microphone signal and to reduce the reverberation portion of the microphone signal on the basis of the estimated reverberation energy,
    wherein the reverberation energy estimator estimates the reverberation energy of speech signals in the loudspeaker-room-microphone environment and the echo cancellation filter removes echo components of a loudspeaker that receives the loudspeaker signal in the loudspeaker-room-microphone environment.

* * * * *